SENSING MEANS

Original Filed May 15, 1961

INVENTOR
GENE L. AMACHER

BY Louis A. Kline
Albert L. Sessler, Jr.
HIS ATTORNEYS

INVENTOR
GENE L. AMACHER

BY Louis A. Kline
Albert L. Sessler, Jr.
HIS ATTORNEYS

United States Patent Office 3,441,715
Patented Apr. 29, 1969

3,441,715
SENSING MEANS

Gene L. Amacher, Dayton, Ohio, assignor to The National Cash Register Company, Dayton, Ohio, a corporation of Maryland Continuation of application Ser. No. 158,610, Dec. 11, 1961, which is a division of application Ser. No. 109,998, May 15, 1961, now Patent No. 3,067,934, dated Dec. 11, 1962. This application Feb. 4, 1966, Ser. No. 520,552
Int. Cl. G06k 7/06
U.S. Cl. 235—61.11 10 Claims This application is a continuation of U.S. patent application Ser. No. 158,610, filed Dec. 11, 1961, which, in turn, is a division of U.S. patent application Ser. No. 109,998, filed May 15, 1961, now U.S. Patent No. 3,067,934, issued Dec. 11, 1962.

This invention relates to sensing means, and particularly to means for sensing data from a record medium.

The present invention is particularly adapted to provide a clock signal for the sampling of data sensed from a perforated tape moved at high speed past a sensing station. However, its utility is not limited to such an apparatus, and many other possible uses are envisioned, such as, for example, in an apparatus for sensing punched cards or magnetic tape.

Novel dual sensing means are provided to generate two initial clock signals, slightly displaced in time with respect to each other, for each data character to be sensed. These two temporally displaced signals are combined, through a novel circuit, to provide a single re-timed clock signal for sampling the data sensed from the tape.

It is accordingly an object of the present invention to provide simple and efficient means for sensing data from a record member.

A further object is to provide means for sensing, from a perforation on a moving record medium, two clock signals which are temporally displaced with respect to each other, and which can be combined into a single re-timed clock signal.

An additional object is to provide signal generating means capable of producing a single re-timed signal from a plurality of signals generated by sensing of a record medium.

Still another object is to provide means for generating a clock signal which may be used in the sampling of data signals.

With these and other objects, which will become apparent from the following description, in view, the invention includes certain novel features of construction and combinations of parts, a plurality of forms or embodiments of which are hereinafter described with reference to the drawings which accompany and form a part of this specification.

FIGS. 4 to 8 inclusive show a plurality of modified forms of sensing means to enable dual sensing of a perforation in the tape, for the production of a re-timed clock signal.

Figure 1:
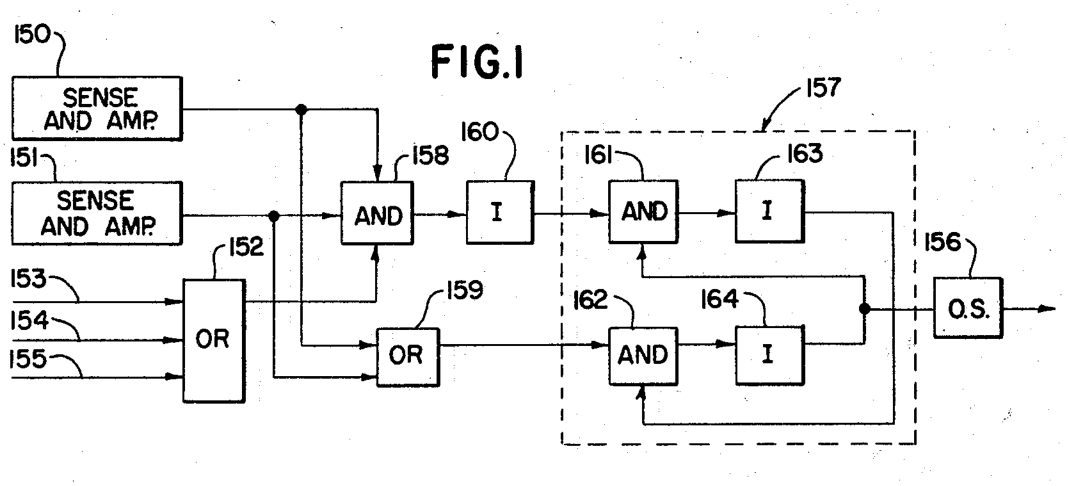
FIG. 1 is a logical block diagram of a clock signal generating system constructed according to the principles of the present invention.

Referring now to FIG. 1, the block diagram shown there includes a number of circuit elements, including photo-diode amplifiers, AND gates, OR gates, inverters, and a mono-stable element, or "one-shot." An explanation of specific circuits which may be employed for the various elements referred to above is given in the parent application, Ser. No. 109,998. It should be understood, however, that many other types of circuits are available for performing the functions of these elements, and could be used, if desired, in the present invention. Also, the upper, or "true," and lower, or "false," logical levels of operation in the illustrated embodiment are 0 volt and minus 8 volts, respectively, but it should be understood that other logical levels could be employed if desired.

Figure 3:
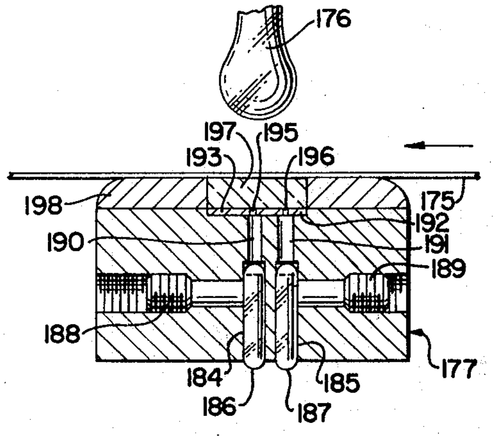
FIG. 3 is a sectional view, taken along line 3—3 of FIG. 2.

In FIG. 1, it will be seen that two sensing and amplifying circuits 150 and 151, which may be of the type shown in FIG. 3 of the parent application, Ser. No. 109,998, are provided for sensing sprocket holes or other regularly spaced perforations in the record medium. The manner in which the photo-diodes of these two circuits are physically arranged in the sensing station to enable said circuits to produce timing signals which are temporally displaced with respect to each other will subsequently be described.

Figure 4:
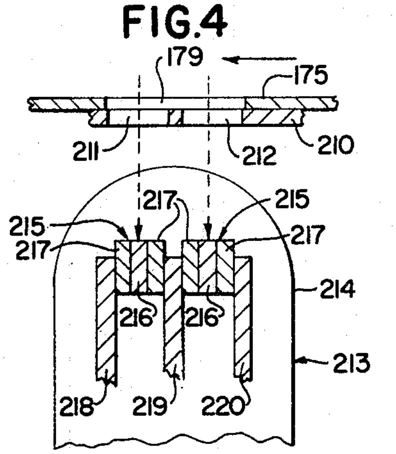

Also shown in FIG. 1 is an OR gate 152, which may be of the general type shown in FIG. 4 of the parent application, Ser. No. 109,998, except that an extra input branch, including a diode, is provided to accommodate three input lines 153, 154, and 155, to the OR gate. These lines carry various control signals for controlling the system represented by the diagram of FIG. 1, in coordination with other devices with which said system is associated. These controls may, for example, include a "read" signal, a "rewind" signal, and a "back space" signal, respectively, on the three lines 153, 154, and 155.

Figure 7:
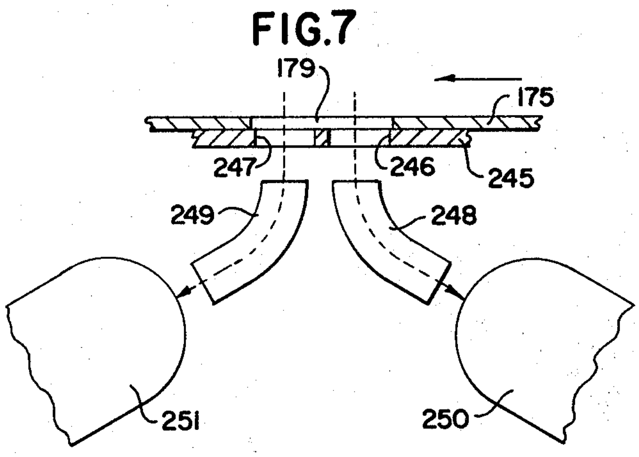

The clock signals which are the output of the system of FIG. 1 are generated by a mono-stable multivibrator, or "one-shot," 156, which may be of the type shown in FIG. 7 of the parent application, Ser. No. 109,998. Input to the "one-shot" 156 is furnished by a bistable element, or "flip-flop," shown generally at 157.

The two inputs to the "flip-flop" 157 are supplied with signals derived from predetermined combinations of the various inputs to the system of FIG. 1, according to the following Boolean expressions:

$$f=(ABC)'$$

and $$f'=A+B$$

where $f$ represents a first input to the "flip-flop" 157; $f'$ represents a second input to the "flip-flop" 157; A represents an output signal from the sensing and amplifying circuit 150; B represents an output signal from the sensing and amplifying circuit 151; and C represents an output signal from the OR gate 152.

Figure 5:
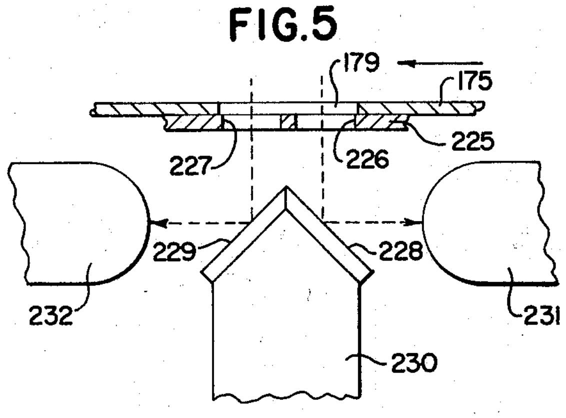

One means for implementing the above Boolean expressions is shown in FIG. 1, and utilizes AND gate 158, which may be of the type shown in FIG. 5 of the parent application, Ser. No. 109,998, OR gate 159, which may be of the type shown in FIG. 4 of the parent application, Ser. No. 109,998, and an inverter 160, which may be of the type shown in FIG. 6 of the parent application, Ser. No. 109,998.

The outputs from the two sensing and amplifying circuits 150 and 151 are connected as inputs to the AND gate 158, and a further input to the AND gate 158 is furnished by the output of the OR gate 152. The output signal from the AND gate 158 is applied to the inverter 160, and appears in inverted form on the output of the inverter 160.

In a simplified version of the present invention, the output of the AND gate 158 may be utilized as a clock signal for control of other apparatus, if desired. In such a case, only the outputs of the sensing and amplifying circuits 150 and 151 are applied to the AND gate 158, so that the output of said gate, which may be utilized as a clock signal, is the logical product of the two temporally displaced timing signals generated by the circuits 150 and 151. This simplified system of course lacks the versatility of the complete system shown in FIG. 1, since it contains no provision for control over the generation of a clock signal by a control signal such as is produced by the OR gate 152 in FIG. 1.

In the system of FIG. 1, the outputs from the sensing and amplifying circuits 150 and 151, in addition to being applied to the AND gate 158, are also applied to the OR gate 159 to furnish the inputs for that gate.

The two inputs to the flip-flop 157 are thus provided by the output of the AND gate 158, as inverted by the inverter 160, and by the output of the OR gate 159. As previously described, the output of the flip-flop 157 is connected of the monostable multivibrator, or "one-shot" 156, the output of which furnishes the clock signal which the system represented by the block diagram 50 of FIG. 1 is designed to produce. However, it is obvious that, if desired, the output of the flip-flop 157 may, itself, be used as a clock signal, thus eliminating the need for the "one-shot" 156, which, when used, provides a clock signal of relatively narrow width. Alternatively, some other signal translating device might be used in place of the "one-shot" 156 to provide a clock signal having wave form characteristics desired for a particular application.

Any one of a number of conventional, well-known bistable elements, or "flip-flops," may be used to produce the output signal which is applied to the input of the "one-shot" 156, under control of the output from the AND gate 158, as inverted by the inverter 160, and under control of the OR gate 159. Shown in FIG. 1 is a "flip-flop" constructed by combining two AND gates 161 and 162 and two inverters 163 and 164.

The AND gates may be of the type shown in FIG. 5 of the parent application, Ser. No. 109,998, and the inverters may be of the type shown in FIG. 6 of the parent application, Ser. No. 109,998. The AND gate 161 derives one of its inputs from the output of the AND gate 158, as inverted by the inverter 160, and derives the other of its inputs from the output of the inverter 164, which inverts the output of the AND gate 162. Output of the AND gate 161 is applied to the inverter 163. The resulting inverted signal constitutes the output of the "flip-flop" 157, and is also applied as one of the inputs to the AND gate 162, the other input of which is taken from the output of the OR gate 159. The output of the AND gate 162 is inverted by the inverter 164 and then applied as one of the inputs to the AND gate 161, as previously described. This arrangement of AND gates 161 and 162, and inverters 163 and 164, is one means by which a "flip-flop" 157, having the desired characteristics for use in the system represented by the diagram of FIG. 1, can be realized.

The mode of operation of the system shown in the block diagram of FIG. 1 is described in the parent application, Ser. No. 109,998, and reference may be had thereto for a complete explanation.

A number of different physical arrangements may be utilized to accomplish the dual sprocket hole sensing which is necesary for functioning of the clock signal generating system of FIG. 1.

Figure 2:
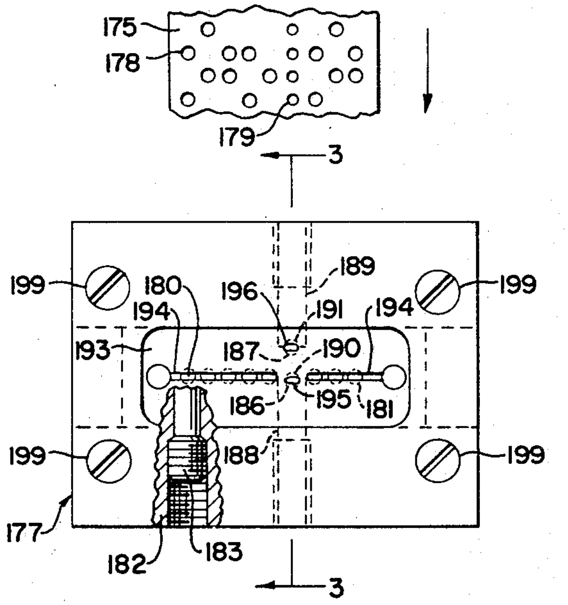
FIG. 2 is a top view of a tape sensing station, showing the dual sensing means for sensing the sprocket holes of the tape.

One such arrangement is shown in FIGS. 2 and 3, wherein a perforated paper tape 175 passes between an illumination source 176 and a sensing station shown generally at 177, on which the tape 175 rides.

The present invention may be used in connection with the sensing of any type of perforated paper tape. In the illustrated embodiment, the tape 175 is an eight-channel tape, having eight rows in which perforations 178 may be made for representation of information, and also including a row of sprocket holes 179, which are provided to enable the tape to be driven, and which, in addition, provide means for generation of clock signals.

Since the tape to be sensed contains eight channels of information, eight photo-diodes 180 are provided for sensing the respective channels, and are mounted in bores 181 in a diode block 182. A plurality of retaining means 183, which may be in the form of threaded rod-like elements, are provided for holding the diodes 180 in proper position. Also mounted in the block 181 in a pair of bores 184 and 185 are two diodes 186 and 187, respectively, for sensing of the sprocket holes 179 in the tape 175. Retaining means 188 and 189, which may be in the form of threaded rod-like elements, are provided for retaining the diodes in proper position, and the extensions 190 and 191 of the bores 184 and 185 permit radiation to be transmitted to the diodes 186 and 187.

A transverse recess 192 is provided across that portion of the top of the diode block 182 in which the bores for the various diodes 180, 186, and 187 are located. Said recess is shaped to accommodate a plate 193, which is provided with slots 194 extending across the bores 181 leading to the diodes 180, and is also provided with slots 195 and 196 extending across the extensions 190 and 191 of the bores 184 and 185 leading to the diodes 186 and 187. The plate 193 is in turn covered by a transparent dust cover 197, which, together with a diode block cover 198, secured to the block 182 by screws 199, forms a surface on which the tape 175 rides.

As the tape 175 passes over the sensing station 177 in the direction indicated by the arrows in FIGS. 2 and 3, the diodes 180 are so located as to be able to distinguish between perforated and unperforated positions in the various data channels on the tape. Similarly, the diodes 186 and 187 respond to illumination provided at regular intervals as the sprocket holes 179 pass between said diodes and the illumination source 176.

Examination of FIG. 2 discloses that the center of the extension 190 of the bore 184 for the diode 186 is slightly offset with respect to the centers of the bores 181 for the data sensing diodes 180. Furthermore, it will be noted that the center of the extension 191 of the bore 185 for the diode 187 is spaced from the center of the extension 190 a distance which is slightly greater than the distance between centers of adjacent sprocket holes 179 in the tape 175. In fact, in the case wherein the centers of the tape sprocket holes 179 are 0.1 inch apart, the center of the extension 189 of the bore 184 is offset in one direction a distance of 0.012 inch from a line through the centers of the bores for the data sensing diode, while the center of the extension 191 of the bore 185 is offset in the opposite direction a distance of 0.112 inch from said line. There is thus a distance of 0.124 inch between centers of the bores 190 and 191.

Since a sprocket hole 179 is situated at regular 0.1-inch intervals along the tape 175, illumination from the source 176 passes through adjacent sprocket holes, and the extensions 190 and 191 of the bores 184 and 185, to impinge on the photo-diodes 186 and 187 in such a time relation as to produce an overlapping timing signal. The same overlapping of wave forms can be achieved by locating the photo-diodes 186 and 187 to sense a single sprocket hole rather than two adjacent holes. However, such an arrangement is not feasible using the configuration of parallel extensions 190 and 191 of the bores 185 and 184 shown in FIGS. 2 and 3, because of physical space limitations, and the same effect is achieved by sensing adjacent sprocket holes.

In FIGS. 4, 5, 6, 7 and 8, a number of embodiments of sensing stations are shown in which dual sensing of a single sprocket hole is provided. These embodiments have some advantages over the embodiment of FIGS. 2 and 3, since any possible inaccuracy due to variation in spacing of sprocket holes is eliminated. The wave forms produced by the dual sensing means shown in the embodiments of FIGS. 4, 5, 6, 7 and 8 are, however, substantially the same as those produced by the means shown in the embodiment of FIGS. 2 and 3.

In the enlarged view of FIG. 4, the tape 175, having a sprocket hole 179 therein, passes over a plate 210, in which are two apertures 211 and 212. Positioned beneath the plate 210 is an electrical component 213, enclosed in a transparent envelope 214 and consisting of two individual photo-diode elements 215. Each element 215 includes a layer of light-sensitive "p" type material 216 sandwiched between two layers of "n" type material 217. Both the "p" and "n" type materials are similar to the materials employed in conventional single photo-diode elements. Electrical connections 218, 219, and 220 are provided to enable the elements 215 to be connected into circuits such as the sensing and amplifying circuit shown in FIG. 3 of the parent application, Ser. No. 109,998, for detection of tape perforations and generation of signals therefrom.

In operation, as the leading edge of a perforation 179 in the tape 175 passes over the slots 211 and 212 in the plate 210, radiation passes from an illumination source through the perforations 179, the slots 211 and 212, and the transparent envelope 214, and will impinge on the elements 215 of the component 213, as shown by the dashed-line arrows. Assuming that the direction of movement of the tape 175 is from right to left, as indicated by the solid-line arrow in FIG. 4, the photo-diode 215 beneath the slot 212 will first be illuminated, followed by the photo-diode 215 beneath the slot 211. Illumination of the photo-diode beneath the slot 212 will continue until after illumination of the photo-diode under the slot 211 has commenced. Passage of the trailing edge of the aperture 179 over the plate 210 will subsequently cut off illumination, first through the slot 212, and then through the slot 211. Thus the same type of overlapping wave forms are produced by the embodiment of FIG. 4, as are produced by the embodiment of FIGS. 2 and 3.

In the enlarged view of FIG. 5, a plate 225 is provided, having slots 226 and 227. The tape 175, having a sprocket hole 179 therein, passes over said plate from right to left in the direction of the solid-line arrow. Centered beneath the slots 226 and 227 is a support 230, having two reflective surfaces, or mirrors, 228 and 229 located at the upper end thereof, and being arranged at the proper angles to reflect radiation which passes through the slots 226 and 227 to a pair of photo-diodes 231 and 232. The two radiation paths through the aperture 179 and the slots 226 and 227 are shown in dashed lines. It may readily be seen that, as the tape 175 moves from right to left on the plate 225, overlapping wave forms will be generated by the photo-diodes 231 and 232 respectively.

Figure 6:
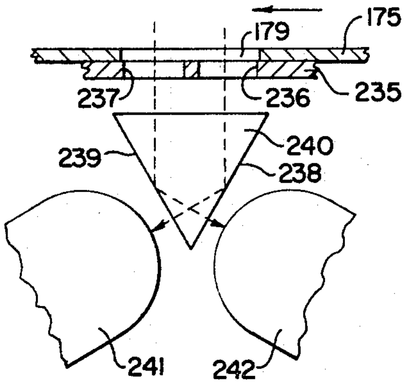

In the enlarged view of FIG. 6, the tape 175, having a sprocket hole 179 therein, is shown passing over a plate 235, in which are two apertures 236 and 237. Centrally positioned below the plate 235 with respect to the apertures 236 and 237 is a prism 240 of triangular cross section, with one apex pointing downward. Surfaces 238 and 239 of the prism 240 are positioned so as to direct radiation in paths shown in dashed lines, which pass through the aperture 179 in the tape 175, and through the apertures 236 and 237, to photo-diodes 241 and 242, respectively.

In this embodiment, as in previous embodiments, it may be seen that passage of the tape 164 in a direction from right to left in FIG. 6 will produce overlapping wave forms, as the aperture 179 passes over the apertures 236 and 237, respectively.

In the enlarged view of FIG. 7, the tape 175, having an aperture 179 therein, is shown passing in a direction from right to left over a plate 245, in which are located apertures 246 and 247. A pair of curved "light pipes" or light-conducting rods 248 and 249 are positioned beneath the apertures 246 and 247, and are of such configuration as to direct radiation in paths shown in dashed lines, which pass through the slots 246 and 247 to impinge on photo-diodes 250 and 251, respectively.

Here again, it will be seen that, as the aperture 179 in the tape 175 moves from right to left over the plate 245, overlapping wave forms will be produced by the impinging of radiation on the photo-diodes 250 and 251.

Figure 8:
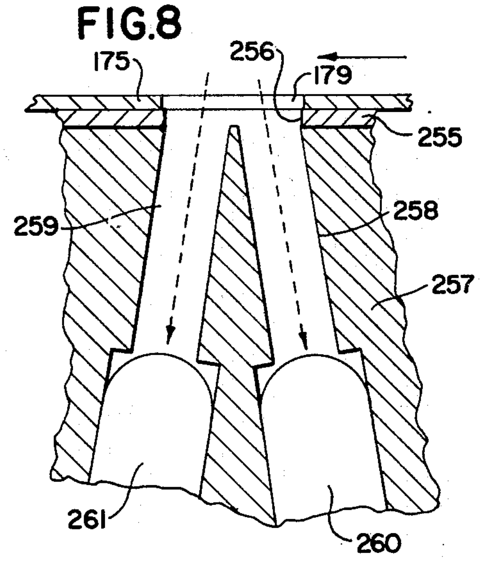

The embodiment shown in the enlarged view of FIG. 8 is somewhat similar to the embodiment shown in FIGS. 2 and 3, except that in FIG. 8 diverging bores are utilized to enable sensing to take place from a single sprocket hole, rather than a pair of sprocket holes. In this embodiment, the tape 175, having an aperture 179 therein, passes from right to left over a plate 255 having an aperture 256 therein. The plate 255 is supported on a diode block 257, in which are located two diverging bores 258 and 259, having lower enlarged portions to receive photo-diodes 260 and 261. Radiation is thus permitted to pass from a source (not shown), in paths shown in dashed lines, through the aperture 179 in the tape 175, the aperture 256 in the plate 255, and the bores 258 and 259, to impinge on the photo-diodes 260 and 261. This results in the generation of overlapping wave forms.

It will thus be seen that a plurality of alternative constructions have been shown and described whereby dual wave forms may be generated from the sprocket holes of paper tape being sensed. These dual wave forms may be utilized in the novel system represented by the block diagram of FIG. 1 to produce a clock signal having the desired characteristics for minimizing errors in sensing of the tape.

While the forms of mechanism shown and described herein are admirably adapted to fulfill the objcets primarily stated, it is to be understood that it is not intended to confine the invention to the forms or embodiments disclosed herein, for it is susceptible of embodiment in various other forms.

What is claimed is:

1. An optical sensing device for sensing perforations in at least one channel in a record medium as it traverses a sensing station having at least one sensing channel for sensing said perforations, comprising, in combination, a supporting member on which the record medium is adapted to move, said member including a first and a second aperture therein, positioned in a single sensing channel and displaced with respect to each other in the direction of record medium movement to enable sensing of each of the perforations in said one channel in the record medium twice as the record medium moves over said member;

first and second radiation-sensitive means capable of translating radiation directed thereon, through said perforations and apertures, into electrical signals; and radiation-conducting means positioned on the same side of said supporting member as said first and second radiation-sensitive means for conducting radiation from said first and second apertures in the supporting member to the first and sceond radiation-sensitive means, respectively, the distance between the leading edges of said first and second apertures in the supporting member differing from the distance between the leading edges of successive perforations in said one channel of the record medium to enable the generation of temporally overlapping signals by the first and second radiation-sensitive means as the record medium is sensed.

2. An optical sensing device for sensing perforations in at least one channel in a record medium as it traverses a sensing station having at least one sensing channel for sensing said perforations, comprising, in combination, a supporting member on which the record medium is adapted to move, said member including a first and a second aperture therein, positioned in a single sensing channel for sensing of perforations in that channel, and displaced with respect to each other in the direction of record medium movement, the distance between the leading edges of said apertures differing from the distance between the leading edges of successive perforations in said channel of the record medium; and first and second radiation-sensitive means capable of translating radiation directed thereon, through perforations in the record medium, and through said first and second apertures, into electrical signals.

3. An optical sensing device for sensing perforations in a record medium as it traverses a sensing station, comprising, in combination, a supporting member on which the record medium is adapted to move, said member including a first and a second aperture therein, positioned on a line parallel to the direction of movement of the record medium, for sensing of each of the perforations aligned with said first and second apertures twice as the record medium moves over said member;

first and second radiation-sensitive means capable of translating radiation directed thereon, through said perforations and said apertures into electrical signals; and radiation-conducting means positioned on the same side of said supporting member as said first and second radiation-sensitive means for conducting radiation from said first and second apertures in the supporting member to the first and second radiation-sensitive means, respectively, the distance between the first and second apertures in the supporting member differing from the distance between perforations in the record medium to enable the generation of temporally overlapping signals by the first and second radiation-sensitive means as the record medium is sensed.

4. An optical sensing device for sensing data perforations and regularly spaced timing perforations in a record medium as it traverses a sensing station, comprising, in combination, a supporting member with respect to which the record medium is adapted to move, said member having a plurality of data sensing means arranged along a straight line transverse of the direction of travel of the record medium with respect to the supporting member, said data sensing means being positioned to sense data from the various data channels on the record medium;

first and second radiation-sensitive means capable of translating radiation directed thereon through the timing perforations in the record medium into electrical timing signals;

first radiation-conducting means for conducting radiation to the first radiation-sensitive means, comprising a bore in the supporting member positioned to enable sensing of the regularly spaced timing perforations, and slightly offset in one direction from the line of data sensing means; and second radiation-conducting means for conducting radiation to the second radiation-sensitive means, comprising a bore in the supporting member positioned to enable sensing of the regularly spaced timing perforations and offset in a direction opposite to the first radiation-conducting means, from the line of data sensing means, a distance equal to the distance that the first radiation-conducting means is offset from the line of data sensing means plus a distance equal to the interval between adjacent timing perforations on the record medium, the spatial relation of the first and second radiation-conducting means enabling the generation of temporally overlapping timing signals by the first and second radiation-sensitive means.

5. The device of claim 3 in which said radiation-conducting means comprises a pair of parallel bores in said supporting member, said bores being aligned with the first and second apertures in said member, said member also including means for supporting the first and second radiation-sensitive means.

6. The device of claim 3 in which said radiation-conducting means comprises a pair of diverging bores in said supporting member, said member also including means for supporting the first and second radiation-sensitive means.

7. The device of claim 3 in which said radiation-conducting means comprises the transparent envelope of a component which includes said first and second radiation-sensitive means.

8. The device of claim 3 in which said radiation-conducting means comprises a pair of reflective surfaces positioned to reflect radiation from said first and second apertures in said supporting member to said first and second radiation-sensitive means.

9. The device of claim 3 in which said radiation-conducting means comprises a prism capable of directing radiation from said first and second apertures in said supporting member to said first and second radiation-sensitive means.

10. The device of claim 3 in which said radiation-conducting means comprises a pair of light-conducting tubes capable of directing radiation from said first and second apertures in said supporting member to said first and second radiation-sensitive means.

References Cited

UNITED STATES PATENTS

| | | |
|---|---|---|
| 1,807,011 | 5/1931 | Ronger. |
| 1,939,215 | 12/1933 | Kunc. |
| 2,268,498 | 12/1941 | Bryce. |
| 2,297,743 | 10/1942 | Carroll et al. |
| 3,064,887 | 11/1962 | Waters et al. |

DARYL W. COOK, *Primary Examiner.*

U.S. Cl. X.R.

250—219